United States Patent
De Pree et al.

[15] 3,663,163
[45] May 16, 1972

[54] REGENERATION OF CATION EXCHANGE RESINS AND RECOVERY OF SALTS

[72] Inventors: David O. De Pree, Loomis; Herman H. Weyland, Folsom, both of Calif.

[73] Assignee: The United States of America as represented by the Secretary of the Interior

[22] Filed: May 18, 1970

[21] Appl. No.: 38,244

[52] U.S. Cl. .................................23/63, 23/50 R, 23/89, 23/122, 23/129, 210/31, 210/32, 210/38, 260/2.1
[51] Int. Cl. ................B01d 15/04, B01d 15/06, B01d 15/08
[58] Field of Search ......................23/50, 50 BE, 63, 89, 122, 23/129; 210/24, 30, 31, 32, 38

[56] References Cited

FOREIGN PATENTS OR APPLICATIONS 862,688  3/1961  Great Britain.......................23/50 BE Primary Examiner—Samih N. Zaharina
Attorney—Ernest S. Cohen and Roland H. Shubert

[57] ABSTRACT

Cation exchange resins are regenerated by contact with selective chelating agents dissolved in an organic solvent. The chelating agents in turn are regenerated by acidification to precipitate a meal salt.

20 Claims, 1 Drawing Figure

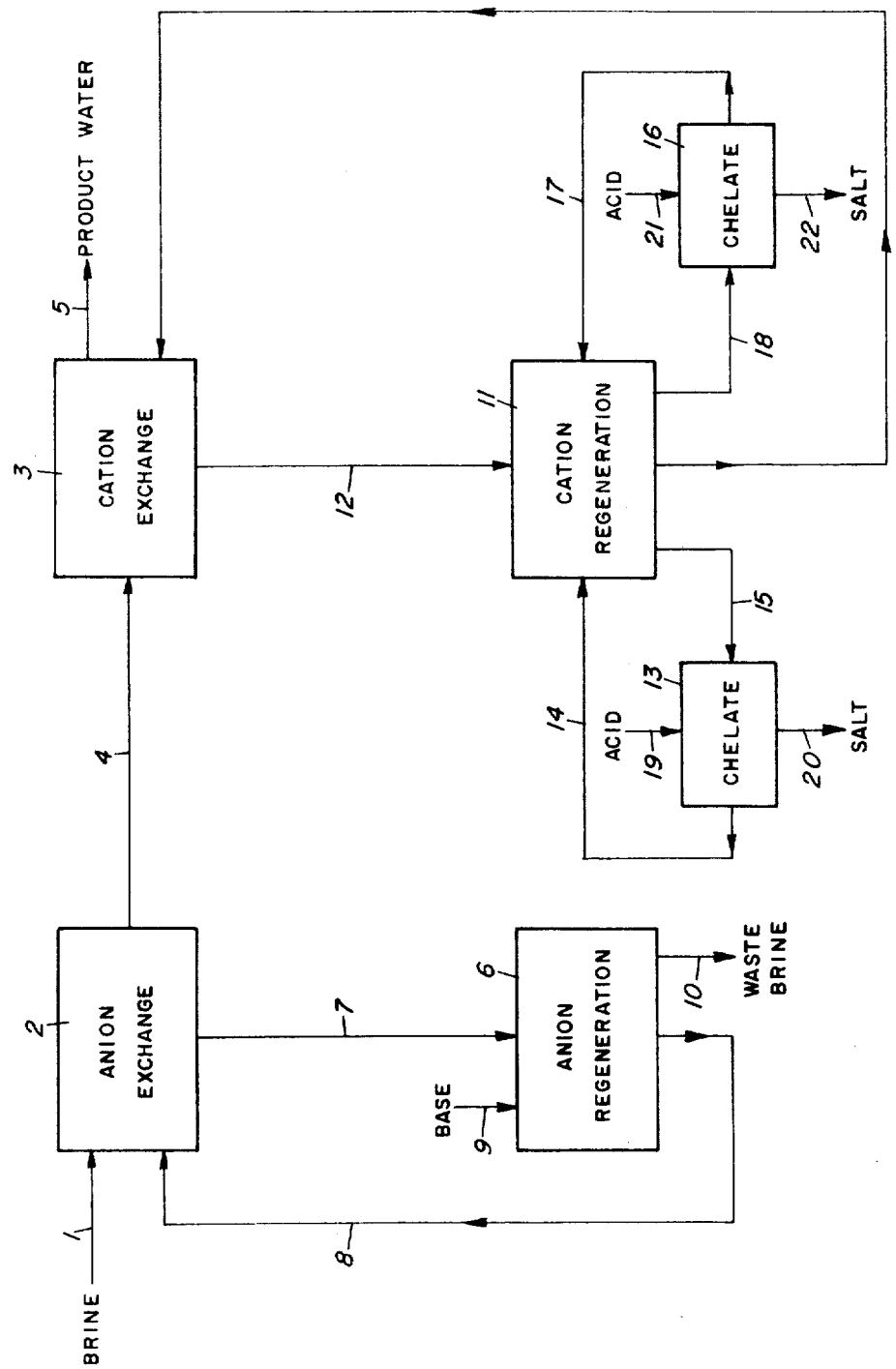

REGENERATION OF CATION EXCHANGE RESINS AND RECOVERY OF SALTS

BACKGROUND OF THE INVENTION

Use of ion exchange techniques to purify water are well known and are commercially practiced. Generally, a water stream is contacted with an anion exchange resin in the hydroxyl form and then is contacted with a cation exchange resin in the hydrogen form. The anion exchange resin is then regenerated by contact with a base while, in similar fashion, the cation exchange resin is acid regenerated. Since the procedure is relatively costly, its use has been limited to those processes where rather small quantities of quite pure water is required. Typical of such uses are purification of boiler feed water and upgrading of water for food, beverage and chemical processing.

It has also been proposed to use this same process for the purification of brackish water, saline water, and brines generally to produce a potable water product. In order to offset the substantial operating costs inherent in ion exchange processes, it has been proposed to separate and recover the cations removed as their commercially pure salts. Up to this time, no feasible system has been devised to accomplish those results.

SUMMARY OF THE INVENTION

We have found that chelating agents, particularly $\beta$-diketones, may be used in organic solution to regenerate loaded cation exchange resins by selectively and sequentially removing metal ions from the resin. Sequential contact of the resin with chelating agents selective for different cations results in a separation of the metal ions on the resin. Metals are recovered in a relatively pure form from the chelate solution by acidification, preferably with an anhydrous acid gas.

Our regeneration technique is particularly useful in ion exchange water purification processes to regenerate cation exchange resins and to recover marketable by-products such as potassium salts.

Hence, it is an object of our invention to regenerate cation exchange resins.

It is a further object of our invention to recover metallic ions in a relatively purified form from ion exchange resins.

A specific object of our invention is to provide a process for water purification by ion exchange techniques in which metal salts are separated and recovered.

DETAILED DESCRIPTION OF THE INVENTION

We have now discovered that certain types of cation exchange resins may be regenerated in a manner which allows selective and sequential separation and recovery of metals as their salts. Our regeneration procedure is applicable to cation exchange resins having an acidity ranging from very weakly acidic to moderately strongly acidic. It is not applicable to the regeneration of very strongly acidic cation exchange resins such as those of the sulfonic acid type. Examples of regenerable cation exchange resins include iminodiacetic acid resins of the polystyrene type and carboxylic acid resins of the polymethacrylic type.

Regeneration is accomplished by sequentially contacting the ion-loaded resin with selected chelating agents in organic solution. It is not necessary to dry the loaded resin prior to regeneration since water-swollen resin is more easily regenerated than is the dry form.

Chelating agents useful in the practice of this invention include broadly those which are soluble in an appropriate organic liquid and which preferentially form organic-soluble chelates with specific metal ions. Selectivity of preferred chelates toward specific metal ions is attained primarily by adjusting the steric effects displayed by the chelating agent. Steric effects may be varied by proper choice of substituent groups.

Examples of monomeric chelating agents useful in our process include diketones, esters, amides, nitrocompounds, amines, amine acids, hydroxyl compounds and combinations of compounds containing these structures which are capable of enol formation and cyclization with metal ions to form chelates. Preferred chelating agents include nitrodiphenylamines and $\beta$-diketones. Particularly useful in our process are various sterically hindered $\beta$-diketones including those having a single exchangeable hydrogen. Specific examples of $\beta$-diketones having a single exchangeable hydrogen include the substituted cyclohexanones such as 2-acetylcyclohexanone.

In its simplest form, our invention comprises regenerating an ion-loaded cation exchange resin with a selective chelating agent in organic solution. Loading of the resin may be accomplished in any conventional fashion such as by ion exchange with an aqueous solution. By proper selection of the chelating agent, it is possible to selectively remove a single cation or group of cations from a resin loaded with a variety of different cations. By sequentially contacting the loaded resin with chelating agents selective for different cations, it is possible to recover metals as their salts in a relatively pure form.

A specific embodiment of our invention is in the regeneration of acidic cation exchange resins used in water purification. Natural brackish waters or brines contain a wide mixture of cations but those normally present in significant amount include only sodium, calcium, magnesium and potassium. Recovery of those cations, especially potassium, as their salts in a relatively pure state provides a saleable by-product having the potential of significantly reducing water purification costs.

Selectivity of a particular chelating agent toward a particular cation has been found to be a function of the ion-chelate fit, degree of steric hindrance exhibited by the chelating moiety, number of hydrogens available for exchange, type of non-coordinating substituent groups making up the chelate molecule and upon the solvent used. In the case of $\beta$-diketones, highest selectivity is obtained when the dione oxygen-oxygen spacing is slightly greater than the ionic radius of the desired cation. Selectivity drops off when the oxygen-oxygen spacing either increases or decreases from that preferred level. Effect of steric interference seems to lie both in restricting rotation and in altering the oxygen-oxygen spacing of the chelate. While the type of non-coordinating substituent groups affects steric hindrance, some substituent groups have an effect on selectivity divorced from steric considerations. For example, halogen containing substituent groups, especially those containing fluorine, markedly increase both regeneration rate and ion selectivity.

Some organic solvents appear to participate with the chelating agent in completing the coordination of a metal ion. Solvents having such properties and useful in our process comprise generally oxygenated organic compounds. Particularly preferred are the lower alcohols. Our most preferred solvent is methanol which affords the fastest regeneration rate while displaying adequate solubility characteristics toward metal chelates.

Recovery of metal ions as their salts is accomplished by acidification of the metal chelate solution. Acidification is preferably accomplished by addition of about a stoichiometric quantity of an anhydrous acid gas such as hydrogen chloride, sulfur dioxide, sulfur trioxide or carbon dioxide. The metal salt formed, being insoluble in the organic solvent, forms a precipitate and the chelating agent is regenerated to its acidic form for reuse. Normal acid regeneration of cation exchange resins is accomplished by contacting the resin with an excess of aqueous acid which produces a corrosive waste stream requiring disposal. In contrast, our process operates at a stoichiometric acid level and produces a marketable regeneration product.

Turning now to the drawing, there is shown a process flow diagram depicting use of our invention in an integrated process for purifying a brackish water or brine.

Brine stream 1 is first subjected to anion exchange with any conventional resin in the hydroxyl form within contacting means 2. After being subjected to anion exchange, the brine stream is passed to cation exchange means 3 by way of conduit 4. The cation exchange resin is in the hydrogen form and may comprise any weakly acidic to moderately strongly acidic resin composition. At this point, both anions and cations originally contained within the incoming brine have been exchanged for hydroxyl and hydrogen ions respectively. A resulting purified water stream is removed from the process, via conduit means 5.

The anion exchange resin is regenerated in the usual manner. For purposes of illustration, the flow diagram depicts the resin as being circulated from contacting means 2 to regenerating means 6 by way of transport means 7 and thereafter being returned to means 2 via conduit 8. This technique may be employed in actual practice or a plurality of contacting means may be provided wherein the resin is cyclically subjected to an exchange and regeneration. Regeneration is accomplished by contacting the loaded resin with an aqueous solution of a hydroxyl-containing base material 9. If desired or economically feasible, the waste brine 10 produced in this regeneration step may be subjected to further treatment for recovery of particular anions. For example, bromine may be recovered by chlorine displacement.

Cation exchange resins are conventionally regenerated by contacting the loaded resin with an acid solution in a manner analogous to that used in the regeneration of anion exchange resins. In our process, however, we regenerate the cation exchange resin by contacting the loaded resin with selected chelating compounds dissolved in an organic solvent. In a preferred mode of operation, the chelating agents are relatively specific to one cation and a plurality of separate chelating agents are sequentially contacted with the cation-loaded resin. For illustration purposes the flow sheet depicts transferral of loaded ion exchange resin from ion exchange contacting means 3 to cation regeneration means 11 via transport means 12. There the loaded resin is contacted with a first chelating agent held within storage and contacting means 13 by circulating the chelate-containing solution to and from cation regeneration means 11 by way of distributing conduit 14 and return conduit 15. During the chelating reaction, a hydrogen ion is supplied the resin from the chelating agent in exchange for a cation. This regenerates the ion exchange resin to the hydrogen form and removes a particular metal ion from the exchange resin.

In a similar fashion, a second chelating agent held within storage and contacting means 16 is then circulated through cation regeneration means 11 by way of distributing means 17 and return line 18. The first and second chelating agents are chosen to provide selective removal of a particular cation or class of cations thus resulting in substantial separation of metal ions simultaneous with regeneration. While only two different chelating agents are shown in the flow sheet, three or more different agents may be used in succession. It is desirable that the last chelating agent be relatively non-specific so as to remove substantially all metal ions of whatever kind and thus complete the resin regeneration.

The metal ions are recovered from their respective chelate solutions as a salt by acid treatment. An acid, preferably in anhydrous, gaseous form, may be introduced into chelate storage and contacting means 14 by way of means 19 where it reacts with the metal chelate to form the corresponding salt and regenerate the chelate to its acid or hydrogen form. A precipitated salt, insoluble in the organic solvent, may be recovered via line 20. Likewise, the second metal chelate solution may be regenerated by introducing acid into means 16 via line 21 and a precipitated salt may be recovered through exit means 22. Acids 19 and 21 may either be the same or different depending upon the metal salt desired.

The following examples more specifically illustrate particular embodiments of our invention and illustrate the effect of process variables on our regeneration technique.

EXAMPLE 1

A cation exchange resin of the polymethacrylic acid type was loaded with potassium and sodium ions in a ratio of 1 to 20. Successive regeneration experiments were performed using methanol solutions of 2-acetylcyclohexanone, dibenzoylmethane and 1,1,1-trifluoro-5, 5-dimethyl-2, 4-hexanedione as chelating agents. Each of the chelating agents provided an 8- to 10-fold enrichment of potassium in the eluent.

Next, additional studies were conducted to determine the effect of minor changes in steric hindrance on the performance of chelating agents. Substitution of a thienyl group in place of the t-butyl group in 1,1,1-trifluoro-5, 5-dimethyl-2, 4-hexanedione resulted in a significant increase in the elution rate of both potassium and sodium while still providing 10-fold enrichment of potassium in the eluent. Substitution of phenyl group, resulting in the chelating compound 1,1,1-trifluoro-4 phenylbutan-2, 4-dione, provided not only a significant increase in elution rate but a 20-fold potassium enrichment as well.

Additional experimentation indicated that an increase in steric hindrance and the corresponding reduction of the oxygen-oxygen separation resulted in a decreased specificity for potassium over sodium. Fluorine-containing substituent groups tended to increase the rate of extraction without significantly affecting the selectivity.

Rate of ion removal appeared to correlate well with the ion-dione fit. Highest rates of potassium removal were obtained with dibenzoyl methane. This chelating agent has an oxygen-oxygen separation of 1.44 A. which should provide an excellent fit for potassium whose ionic radius is 1.33 A. Rate of ion removal decreased not only as the oxygen-oxygen spacing decreased below the ideal but also as the oxygen-oxygen spacing increased beyond that level.

EXAMPLE 2

A typical, commercially available, cation exchange resin of the polymethacrylic acid type was loaded with potassium, sodium, magnesium and calcium in approximately the ratio occurring in sea water. Metal ion content of the resin was as follows:

TABLE 1

| Metal Ion | Content, Meq. |
|---|---|
| $K^+$ | 0.402 |
| $Na^+$ | 19.61 |
| $Mg^{++}$ | 2.26 |
| $Ca^{++}$ | 0.391 |

The resin was then regenerated by sequential treatment with 0.1 N solutions of selected chelating agents in methanol and the extracts analyzed for all four metal ions. Enrichment and removal of potassium was accomplished using 2-acetylcyclohexanone while acetylacetone was used to strip potassium. Citric acid was used both to remove and substantially separate magnesium and calcium by taking advantage of the fact that magnesium is concentrated in the first eluent while calcium builds up in the later fractions. Results are shown in the following table:

TABLE 2

| Extraction number | Chelating agent | Metal ion recovered, meq. | | | |
|---|---|---|---|---|---|
| | | $K^+$ | $Na^+$ | $Mg^{++}$ | $Ca^{++}$ |
| 1 | 2-acetylcyclohexanone | 0.3 | 2.3 | 0.0 | 0.0 |
| 2 | Acetylacetone | 0.0 | 13.0 | 0.0 | 0.0 |
| 3 | Citric acid [1] | 0.0 | 0.0 | 3.0 | 0.1 |
| 4 | Citric acid [2] | 0.0 | 0.0 | 0.0 | 0.4 |

[1] First 8% of eluent.
[2] Remaining 92% of eluent.

These data show the effectiveness of the chosen chelating agents in sequentially separating metal ions. While the separation of potassium from sodium was rather poor, nevertheless there was a seven-fold enrichment of potassium in extract No. 1. Some discrepancies arise when comparing the above data with the starting resin composition but this is attributable to analytical error.

EXAMPLE 3

A variety of solvents capable of participation with the chelating agent in completing the coordination of metal ions were evaluated in the regeneration of a polymethacrylic acid-type cation exchange resin. Solvents investigated included those containing as coordinating structures nitrile groups, ether linkages, carboxyl groups and hydroxyl groups. Also investigated was the effect of different spacings between functional groups of the same type and the effect of substituent structures of varying sizes.

It was found that regeneration rate was highest in alcohol solvents, particularly methanol, and that the rate dropped sharply in either ketones or ethers. Structure of non-coordinating substituent groups was found to have a large effect in some cases. For example, a 20-fold difference in regeneration rate was observed between dimethoxy ethane and dimethoxy methane.

EXAMPLE 4

Effect of temperature on the regeneration rate of a cation exchange resin was investigated. A jacketed column of a polymethacrylic acid exchange resin was loaded with sodium and potassium in a 20 to 1 ratio. Experiments were then performed using a 0.1 N solution of $\beta$-diketone as the eluent. Typical results were as follows:

TABLE 3

| Run | Temperature, °C | Removal, ppm Na$^+$ | K$^+$ |
| --- | --- | --- | --- |
| 1 | 20 | 515 | 280 |
| 2 | 40 | 640 | 330 |

While some temperature effects are noticeable, these are too small to be of practical economic importance.

In further experimentation, the effect on regeneration of the following variables was studied: (1) Concentration of ligand, (2) percent water in solvent, (3) contact time, (4) percent water on the resin, (5) equivalents of ligand used and (6) stirring rate. Of these variables, ligand concentration had the greatest effect on regeneration. None of the other variables appeared to cause any great difference in regeneration except that a dry resin substantially reduced regeneration rates.

EXAMPLE 5

Sodium and potassium chelates of acetylacetone in methanol solution were regenerated by treatment with hydrogen chloride. The corresponding chloride salts were formed and precipitated out of solution while the ligand was regenerated. Photomicrographs of the precipitated salts revealed a crystal size generally in the range of 100 to 450 microns. The precipitated sodium chloride showed minor contamination with solvent or other impurities while the potassium chloride showed no contamination.

The foregoing examples and disclosures illustrate the novelty and usefulness of our invention. Changes and modifications to suit specific needs will be readily apparent to those skilled in the art.

What is claimed is:

1. A process for regenerating a water-swollen very weakly acidic to moderately strongly acidic cation exchange resin loaded with metal ions which comprises contacting the resin with a first chelating agent in organic solution, said chelating agent being capable of coordinating with at least one of the metal ions loaded on the resin.

2. The process of claim 1 wherein the chelating agent is chosen from the group consisting of nitrodiphenylamines and $\beta$-diketones.

3. The process of claim 2 wherein the organic solution comprises an oxygenated organic compound.

4. The process of claim 3 wherein the organic compound comprises a lower alcohol.

5. The process of claim 4 wherein the metal ions loaded on the cation exchange resin comprise alkali and alkaline earth metal ions.

6. The process of claim 5 wherein the chelating agent selectively coordinates with monovalent cations.

7. The process of claim 6 wherein the chelating agent is a $\beta$-diketone having a single hydrogen available for exchange.

8. The process of claim 7 wherein said $\beta$-diketone displays substantial selectivity for potassium over sodium.

9. The process of claim 8 wherein said lower alcohol is methanol.

10. The process of claim 9 wherein the cation exchange resin is sequentially contacted with a second chelating agent in methanol solution to remove metal ions not coordinated by the first chelating agent.

11. The process of claim 10 wherein the methanol solutions containing metal chelates formed by said first and second chelating agents are treated with an acid gas to precipitate metal salts and to regenerate said chelating agents.

12. The process of claim 11 wherein said acid gas is anhydrous and is chosen from the group consisting of hydrogen chloride, sulfur dioxide, sulfur trioxide and carbon dioxide.

13. A process for purifying a saline water stream and recovering metals contained in that stream comprising:
  a. contacting said saline water with a moderately acidic cation exchange material in the hydrogen form to remove metal ions from solution,
  b. periodically contacting said cation exchange material in sequential fashion with a plurality of chelating regenerants in organic solution to form chelates of metal ions, and
  c. treating said organic solutions containing metal chelates with an acid regenerant to precipitate metal salts and to restore the chelating regenerants to an active form.

14. The process of claim 13 wherein said cation exchange resin is first contacted with a chelating agent displaying substantial selectivity for potassium.

15. The process of claim 14 wherein said chelating agent is a $\beta$-diketone having a single hydrogen available for exchange.

16. The process of claim 15 wherein said organic solution comprises a lower alcohol.

17. The process of claim 16 wherein said acid regenerant is an acid gas.

18. The process of claim 17 wherein said acid gas is anhydrous and is selected from the group consisting of hydrogen chloride, sulfur dioxide, sulfur trioxide and carbon dioxide.

19. The process of claim 18 wherein said lower alcohol is methanol.

20. The process of claim 19 wherein said $\beta$-diketone is 2-acetylhexanone.